United States Patent
Beall et al.

(10) Patent No.: US 12,552,528 B2
(45) Date of Patent: *Feb. 17, 2026

(54) PROPROTOR LOCKOUT SYSTEMS FOR TILTROTOR AIRCRAFT

(71) Applicant: Textron Innovations Inc., Providence, RI (US)

(72) Inventors: Grant Michael Beall, Plano, TX (US); Kyle Thomas Cravener, Watauga, TX (US); Brady Garrett Atkins, Euless, TX (US); Gilberto Morales, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,187

(22) Filed: Mar. 20, 2024

(65) Prior Publication Data

US 2025/0250005 A1    Aug. 7, 2025

Related U.S. Application Data

(63) Continuation of application No. 17/825,278, filed on May 26, 2022, now Pat. No. 11,964,757.

(51) Int. Cl.
  *B64C 29/00*  (2006.01)
  *B64C 11/28*  (2006.01)
  *B64D 35/00*  (2006.01)
  *F16D 71/00*  (2006.01)

(52) U.S. Cl.
  CPC .......... *B64C 29/0033* (2013.01); *B64C 11/28* (2013.01); *B64D 35/00* (2013.01); *F16D 71/00* (2013.01)

(58) Field of Classification Search
  CPC ....... B64C 11/28; B64C 27/30; B64C 27/022; B64C 27/50; B64C 29/0033; B64C 11/325; B64C 11/385; F16C 2326/43
  See application file for complete search history.

(56) References Cited

U.S. PATENT DOCUMENTS

| | | | |
|---|---|---|---|
| 3,528,630 A | 9/1970 | Ferris et al. |
| 3,592,412 A | 7/1971 | Glatfelter |
| 6,622,962 B1 | 9/2003 | White |
| 8,517,685 B2 | 8/2013 | Manfredotti |

(Continued)

*Primary Examiner* — Joshua J Michener
*Assistant Examiner* — Ryan Andrew Yankey
(74) *Attorney, Agent, or Firm* — Lawrence Youst PLLC

(57) ABSTRACT

A lockout system for an aircraft having a rotor assembly. The lockout system includes a drive shaft coupled to and rotatable with the rotor assembly, a nonrotating airframe structure disposed proximate the drive shaft and a lock assembly having first and second lock members. The first lock member is rotatable with the drive shaft and includes a plurality of bearing assemblies. The second lock member is coupled to the nonrotating airframe structure and includes a cradle having a plurality of asymmetric slots each with a leading ramp and a trailing stop. The lock assembly has a disengaged position in which rotation of the drive shaft is allowed and an engaged position in which each of the bearing assemblies is seated within one of the asymmetric slots to prevent rotation of the drive shaft. The lock assembly is actuatable between the engaged and disengaged positions.

20 Claims, 8 Drawing Sheets

(56) References Cited

U.S. PATENT DOCUMENTS

| | | |
|---|---|---|
| 8,998,125 B2 | 4/2015 | Hollimon et al. |
| 9,156,545 B1 | 10/2015 | Fenny et al. |
| 10,065,736 B2 | 9/2018 | Foskey |
| 10,077,106 B2 | 9/2018 | Foskey |
| 10,086,936 B2 | 10/2018 | Foskey |
| 10,167,080 B2 | 1/2019 | Foskey |
| 10,239,605 B2 | 3/2019 | Foskey et al. |
| 10,336,447 B2 | 7/2019 | Tzeng et al. |
| 10,745,124 B2 | 8/2020 | Davis et al. |
| 10,759,527 B2 | 9/2020 | Przybyla |
| 10,781,863 B2 | 9/2020 | Gilliland et al. |
| 10,843,798 B2 | 11/2020 | Przybyla et al. |
| 10,875,640 B2 | 12/2020 | Speller et al. |
| 10,994,839 B2 | 5/2021 | Kooiman et al. |
| 11,008,113 B2 | 5/2021 | Speller |
| 11,060,562 B2 | 7/2021 | Olson |
| 11,964,757 B2 * | 4/2024 | Beall .................. B64C 29/0033 |
| 12,199,494 B2 * | 1/2025 | Ouyang .................. B64C 27/30 |
| 2016/0152329 A1 | 6/2016 | Tzeng et al. |
| 2017/0144746 A1 | 5/2017 | Schank et al. |
| 2019/0016451 A1 | 1/2019 | Ehinger et al. |
| 2019/0301537 A1 | 10/2019 | Olson |
| 2021/0094683 A1 | 4/2021 | Foskey |
| 2021/0107638 A1 | 4/2021 | Cravener et al. |
| 2023/0406492 A1 | 12/2023 | Beall et al. |

\* cited by examiner

PROPROTOR LOCKOUT SYSTEMS FOR TILTROTOR AIRCRAFT

CROSS-REFERENCE TO RELATED APPLICATIONS

The present application is a continuation of co-pending application Ser. No. 17/825,278 filed May 26, 2022.

TECHNICAL FIELD OF THE DISCLOSURE

The present disclosure relates, in general, to tiltrotor aircraft having rotary and non-rotary flight modes and, in particular, to proprotor lockout systems for tiltrotor aircraft configured to selectively prevent rotation of the proprotor assemblies and rotationally align the proprotor blades with blade grips for blade folding during the non-rotary flight mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downwardly as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. Such rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor assembly. The nacelles are rotatable relative to the fixed wing such that the proprotor assemblies have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of conventional tiltrotor aircraft in forward flight.

SUMMARY

In a first aspect, the present disclosure is directed to a lockout system for an aircraft having a rotor assembly. The lockout system includes a drive shaft coupled to and rotatable with the rotor assembly. A nonrotating airframe structure is disposed proximate the drive shaft. A lock assembly has first and second lock members. The first lock member is coupled to and rotatable with the drive shaft. The second lock member is coupled to the nonrotating airframe structure. The first lock member includes a plurality of bearing assemblies. The second lock member includes a cradle having a plurality of asymmetric slots, each asymmetric slot including a leading ramp and a trailing stop. The lock assembly has a plurality of positions including a disengaged position in which rotation of the drive shaft is allowed and an engaged position in which each of the bearing assemblies is seated within one of the asymmetric slots to prevent rotation of the drive shaft. The lock assembly is actuatable between the disengaged and engaged positions.

In certain embodiments, the drive shaft may be a drive shaft disposed in a wing. In other embodiments, the drive shaft may be a proprotor mast. In some embodiments, the nonrotating airframe structure may be a gearbox housing. In other embodiments, the nonrotating airframe structure may be a wing airframe structure. In certain embodiments, each of the bearing assemblies may include a spherical roller bearing. In some embodiments, each of the bearing assemblies may include at least one of a hardened roller surface or a high lubricity roller surface. In certain embodiments, the plurality of bearing assemblies may include first, second and third bearing assemblies. In such embodiments, the first, second and third bearing assemblies may be uniformly circumferentially distributed at 120 degree intervals. In some embodiments, the first lock may include a collar assembly having internal splines configured to couple with external splines of the drive shaft to prevent relative rotation therebetween.

In certain embodiments, the plurality of asymmetric slots may include first, second and third asymmetric slots. In such embodiments, the first, second and third asymmetric slots may be uniformly circumferentially distributed at 120 degree intervals. In some embodiments, the second lock member may include a sleeve and a piston wherein the sleeve may be coupled to the nonrotating airframe structure to prevent relative rotation and relative translation therebetween and the piston may be slidably disposed within the sleeve and configured to translate relative thereto to shift the lock assembly between the disengaged and engaged positions. In such embodiments, the sleeve and the piston may include a nonrotation feature to prevent relative rotation therebetween. In certain embodiments, the trailing stop of each asymmetric slot may have a surface that is substantially parallel with a central axis of the second lock member. In some embodiments, the leading ramp of each asymmetric slot may have a curved upper profile. For example, the curved upper profile may have a progressively decreasing angle between 60 degrees and 30 degrees. In certain embodiments, an entry gap of each asymmetric slot may be at least twice as wide as a base gap of each asymmetric slot. In some embodiments, each of the bearing assemblies is seated within one of the asymmetric slots when the bearing assembly contacts both the leading ramp and the trailing stop of the respective asymmetric slot.

In a second aspect, the present disclosure is directed to a tiltrotor aircraft having rotary and non-rotary flight modes. In the rotary flight mode, the tiltrotor aircraft operates at least two proprotor assemblies each having a plurality of proprotor blades. In the non-rotary flight mode, the proprotor assemblies are rotationally locked and circumferentially clocked for blade folding. For each proprotor assembly, the aircraft includes a proprotor drive shaft coupled to and rotatable with the proprotor assembly. A nonrotating airframe structure is disposed proximate the proprotor drive shaft. A lock assembly has first and second lock members. The first lock member is coupled to and rotatable with the proprotor drive shaft. The second lock member is coupled to the nonrotating airframe structure. The first lock member includes a plurality of bearing assemblies. The second lock member includes a cradle having a plurality of asymmetric slots, each asymmetric slot including a leading ramp and a trailing stop. The lock assembly has a plurality of positions including a disengaged position in which rotation of the proprotor drive shaft is allowed and an engaged position in which each of the bearing assemblies is seated within one of the asymmetric slots to prevent rotation of the proprotor drive shaft. The lock assembly is actuatable between the disengaged and engaged positions.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
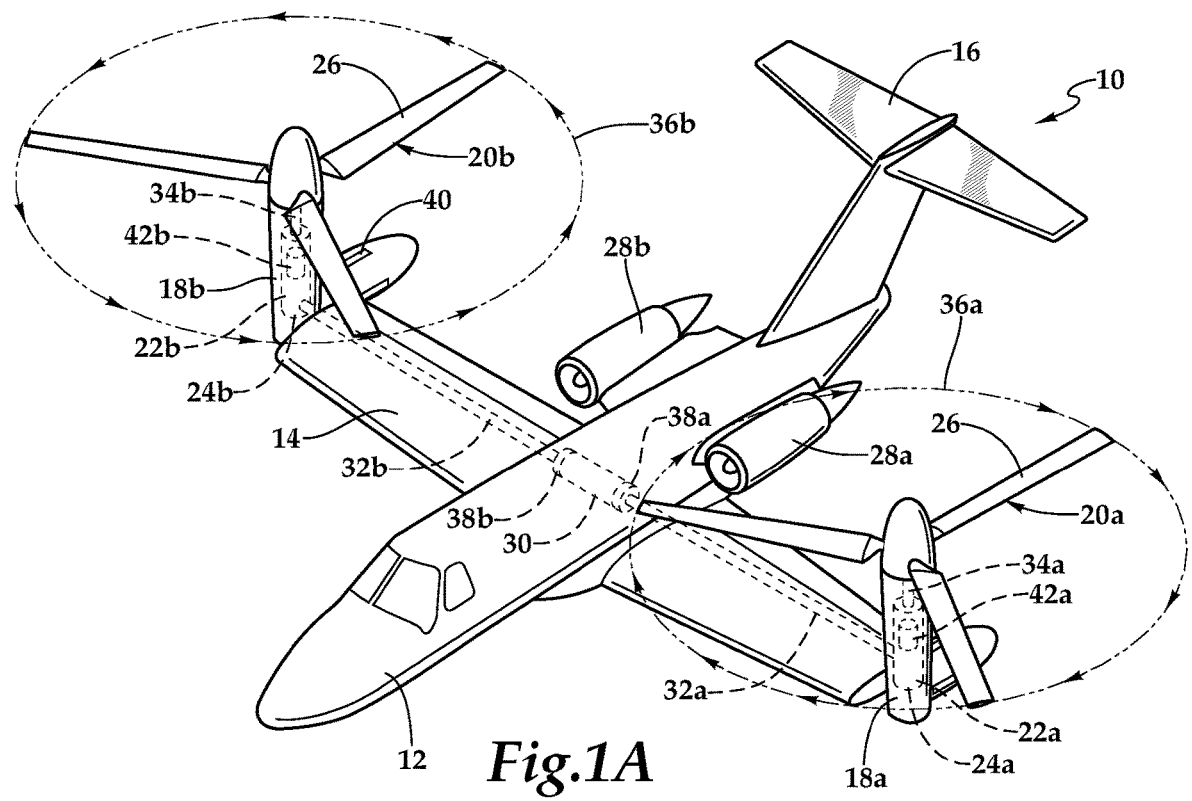
FIGS. 1A-1D are schematic illustrations of a tiltrotor aircraft including proprotor lockout systems in accordance with embodiments of the present disclosure.
Figure 1B:
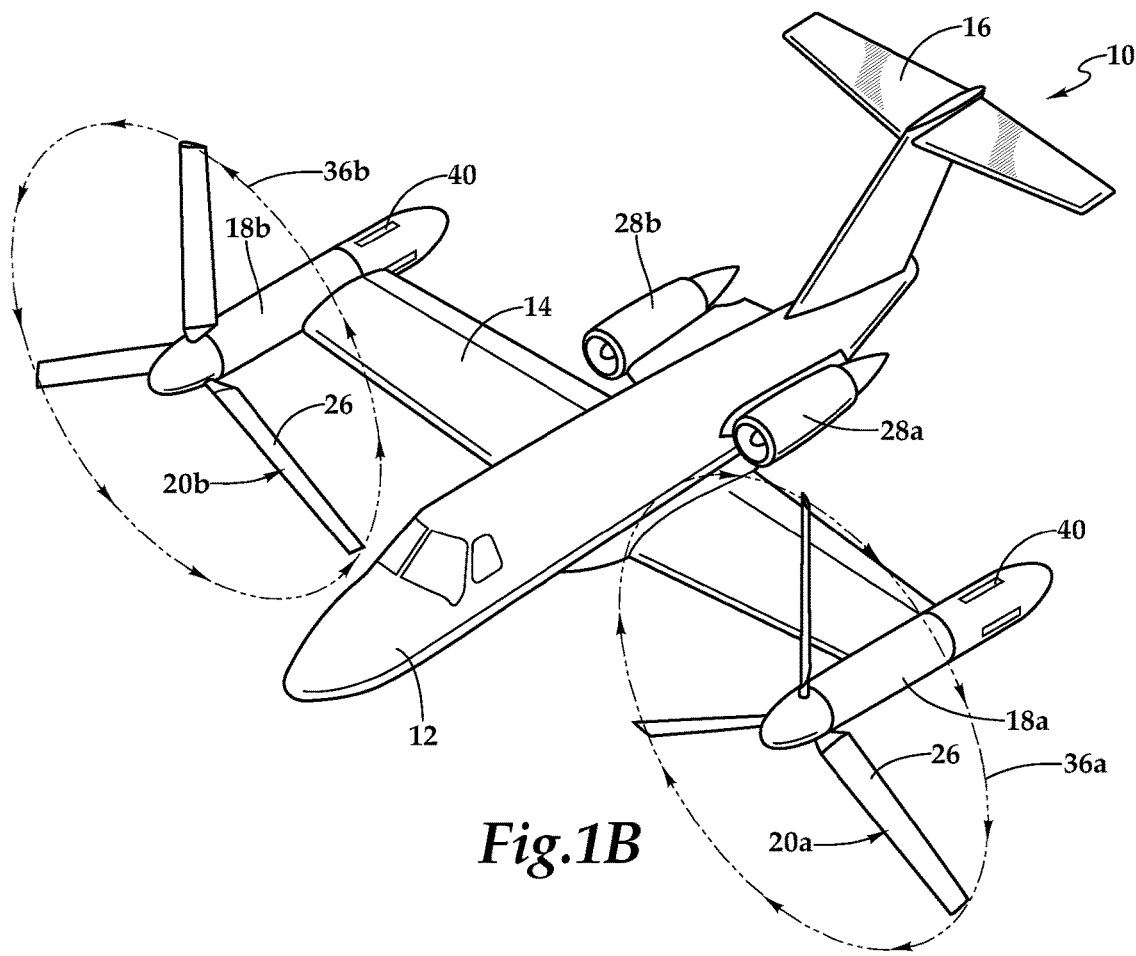
Figure 1C:
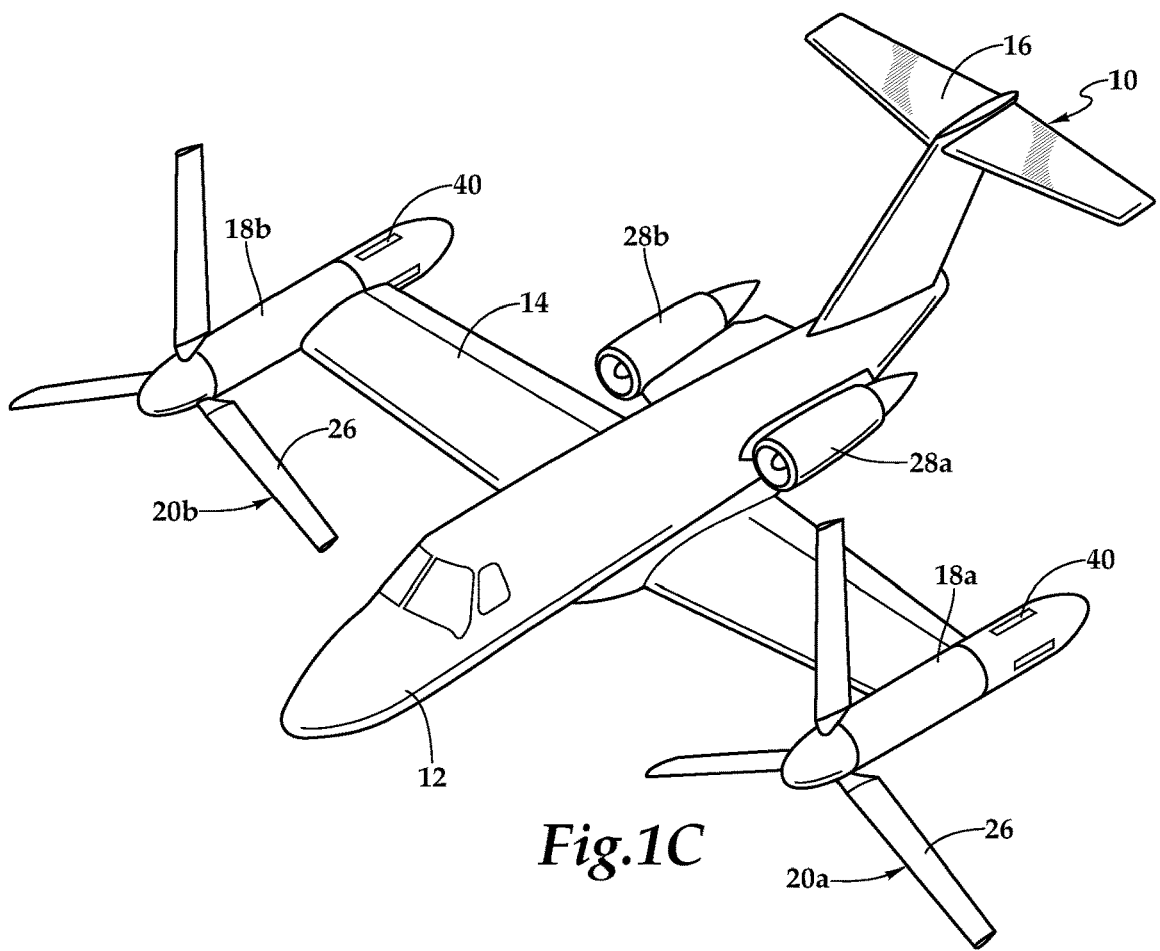
Figure 1D:
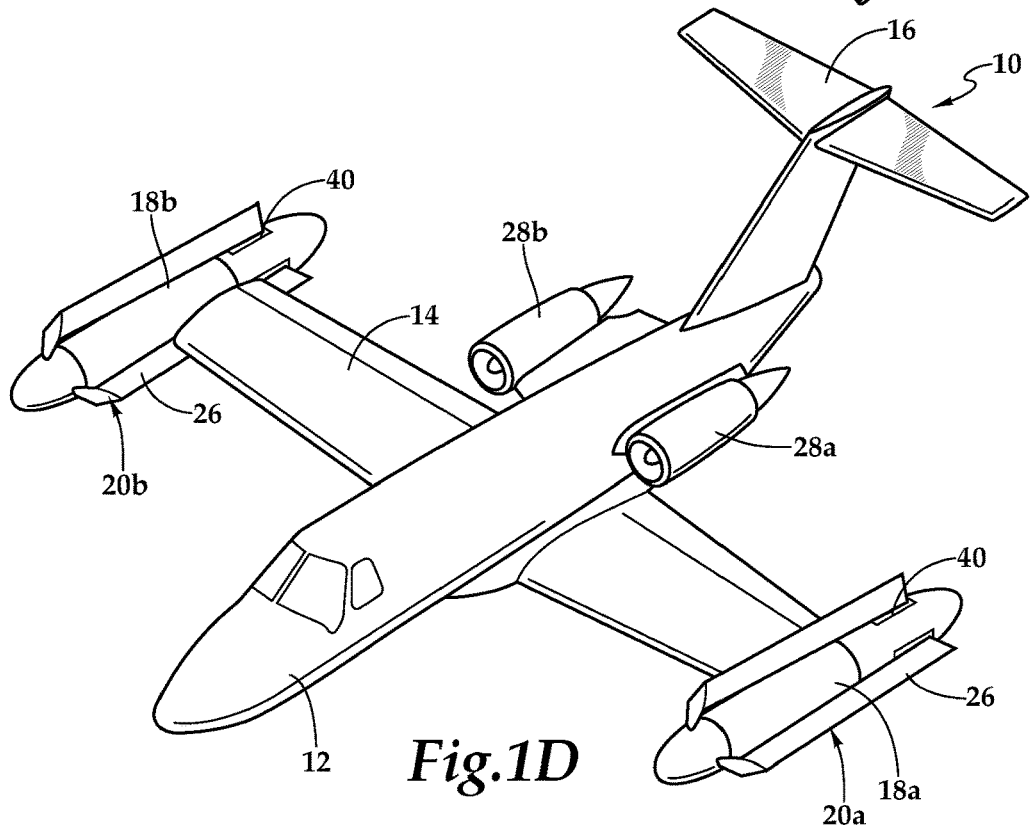

Referring to FIGS. 1A-1D in the drawings, a tiltrotor aircraft is schematically illustrated and generally designated 10. Aircraft 10 includes a fuselage 12, a wing 14 and a tail assembly 16 including control surfaces operable for horizontal and/or vertical stabilization during forward flight. Located proximate the outboard ends of wing 14 are pylon assemblies 18a, 18b that are tiltable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate rotor assemblies depicted as proprotor assemblies 20a, 20b, respectively. For example, a proprotor gearbox 22a is housed within pylon assembly 18a and a proprotor gearbox 22b is housed within pylon assembly 18b. Proprotor gearbox 22a includes a proprotor gearbox housing 24a that is part of the nonrotating airframe structure of aircraft 10. Similarly, proprotor gearbox 22b includes a proprotor gearbox housing 24b that is part of the nonrotating airframe structure of aircraft 10. Disposed within each of proprotor gearbox 22a and proprotor gearbox 22b are a plurality of gears, such as planetary gears, used to adjust the engine output to a suitable rotational speed so that the engines and the proprotor assemblies may rotate at optimum speeds in the rotary flight modes of aircraft 10.

Each proprotor assembly 20a, 20b includes a plurality of proprotor blades 26 that are operable to be rotated, as best seen in FIGS. 1A-1B, operable to be feathered, stopped, clocked and locked, as best seen in FIG. 1C and operable to be folded, as best seen in FIG. 1D. Proprotor assembly 20a is rotated responsive to torque and rotational energy provided by one or both of engines 28a, 28b via a mid-wing gearbox 30, a drive shaft 32a, proprotor gearbox 22a and a drive shaft depicted as mast 34a. Similarly, proprotor assembly 20b is rotated responsive to torque and rotational energy provided by one or both of engines 28a, 28b via mid-wing gearbox 30, a drive shaft 32b, proprotor gearbox 22b and a drive shaft depicted as mast 34b. Engines 28a, 28b are located along an aft portion of fuselage 12. Engines 28a, 28b may be operated in a turboshaft mode, as best seen in FIGS. 1A-1B or a turbofan mode, as best seen in FIGS. 1C-1D.

FIG. 1A illustrates aircraft 10 in VTOL or helicopter flight mode, in which proprotor assemblies 20a, 20b are rotating in a substantially horizontal plane to provide vertical lift, such that aircraft 10 flies much like a conventional helicopter. In this configuration, engines 28a, 28b are operating in turboshaft mode wherein hot combustion gases in each engine 28a, 28b cause rotation of a power turbine coupled to a respective input shaft of mid-wing gearbox 30. Thus, in this configuration, aircraft 10 is considered to be in a rotary flight mode as proprotor assemblies 20a, 20b are rotating and operable to provide thrust for aircraft 10. FIG. 1B illustrates aircraft 10 in proprotor forward flight mode, in which proprotor assemblies 20a, 20b are rotating in a substantially vertical plane to provide a forward thrust enabling wing 14 to provide a lifting force responsive to the forward airspeed, such that aircraft 10 flies much like a conventional propeller driven aircraft. In this configuration, engines 28a, 28b are operating in the turboshaft mode and aircraft 10 is considered to be in the rotary flight mode.

In the rotary flight mode of aircraft 10, proprotor assemblies 20a, 20b rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 36a, and proprotor assembly 20b rotates counterclockwise, as indicated by motion arrows 36b. In the illustrated embodiment, proprotor assemblies 20a, 20b each include three proprotor blades 26 that are uniformly spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a, 20b are selectively positioned between proprotor forward flight mode and helicopter mode, which can be referred to as a conversion flight mode.

FIG. 1C illustrates aircraft 10 in transition between proprotor forward flight mode and airplane forward flight mode, in which engines 28a, 28b have been disengaged from proprotor assemblies 20a, 20b and proprotor blades 26 have been feathered, or oriented to be streamlined in the direction of flight, such that proprotor blades 26 act as brakes to aerodynamically slow the rotation of proprotor assemblies 20a, 20b. Alternatively or additionally, the rotation of proprotor assemblies 20a, 20b may be slowed or stopped using brake systems 38a, 38b that are operably associated with mid-wing gearbox 30, as best seen in FIG. 1A. In other embodiments, brake systems could be positioned at other locations along drive shafts 32a, 32b. Preferably, brake systems 38a, 38b include position sensors such that drive shafts 32a, 32b can be stopped at predetermined rotational positions. By stopping drive shafts 32a, 32b in known rotational positions, the rotational position of each proprotor assembly 20a, 20b is also known. This rotational clocking of proprotor blades 26 is important to prevent contact with wing 14 during blade folding and to align each proprotor blade 26 with a respective blade grip 40 operably associated with pylon assemblies 18a, 18b for blade folding.

Due to the distance between brake systems 38a, 38b and proprotor assemblies 20a, 20b as well as the gear systems therebetween, however, use of the position sensors may result in only a coarse rotational clocking of proprotor assemblies 20a, 20b. Once proprotor assemblies 20a, 20b have been slowed or stopped and have been coarsely rotationally clocked, proprotor lockout systems 42a, 42b disposed within proprotor gearboxes 22a, 22b are shifted from a disengaged position to an engaged position to lock proprotor assemblies 20a, 20b against rotation and to precisely rotationally clock proprotor assemblies 20a, 20b such that each proprotor blade 26 will be circumferentially aligned with one of blade grips 40 for blade folding. In the illustrated configuration of aircraft 10 in FIG. 1C, engines 28a, 28b are operating in turbofan mode wherein hot combustion gases in each engine 28a, 28b cause rotation of a power turbine coupled to an output shaft that is used to power a turbofan that forces bypass air through a fan duct to create forward thrust enabling wing 14 to provide a lifting force responsive to the forward airspeed, such that aircraft 10 flies much like a conventional jet aircraft. In this configuration, aircraft 10 is considered to be in a non-rotary flight mode as proprotor assemblies 20a, 20b are no longer rotating and thus, not providing thrust for aircraft 10.

FIG. 1D illustrates aircraft 10 in high speed, airplane forward flight mode, in which proprotor blades 26 have been folded and are oriented substantially parallel to respective pylon assemblies 18a, 18b to minimize the drag force generated by proprotor blades 26. To prevent chatter or other movement of proprotor blades 26 when folded, proprotor blades 26 are preferably received within blade grips 40 of pylon assemblies 18a, 18b. In this configuration, engines 28a, 28b are operating in the turbofan mode and aircraft 10 is considered to be in the non-rotary flight mode. The forward cruising speed of aircraft 10 can be significantly higher in airplane forward flight mode versus proprotor forward flight mode as the risk of forward airspeed induced proprotor aeroelastic instability has been removed.

Even though aircraft 10 has been described as having two engines fixed to the fuselage, it should be understood by those having ordinary skill in the art that other engine arrangements are possible and are considered to be within the scope of the present disclosure including, for example, having a single engine that provides torque and rotational energy to both of the proprotor assemblies. In addition, it should be appreciated that tiltrotor aircraft 10 is merely illustrative of a variety of aircraft that can implement the embodiments disclosed herein. Indeed, the proprotor lockout systems of the present disclosure may be utilized on any type of rotorcraft in which locking of a rotor system against rotation during flight or during storage is desired. Other aircraft implementations can include helicopters, quad tiltrotor aircraft, hybrid aircraft, compound aircraft, unmanned aerial systems and the like. As such, those having ordinary skill in the art will recognize that the proprotor lockout systems disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2:
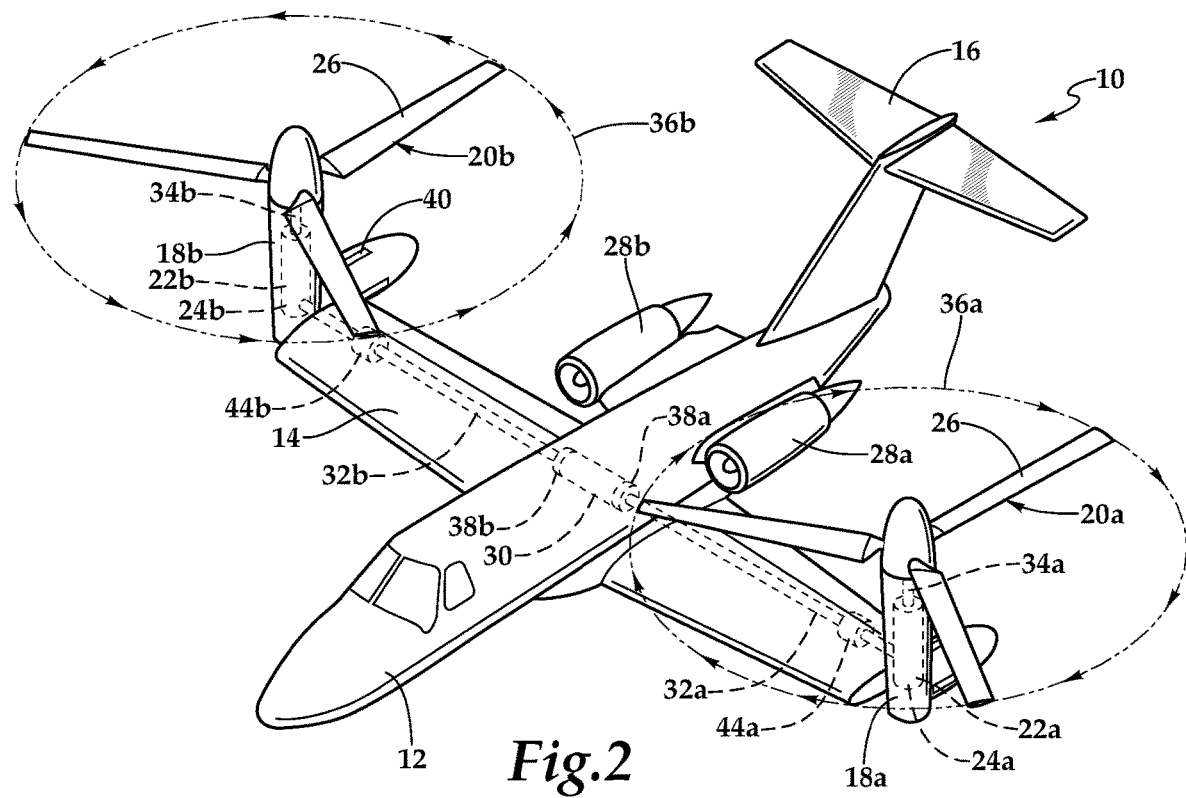
FIG. 2 is a schematic illustration of a tiltrotor aircraft including proprotor lockout systems in accordance with embodiments of the present disclosure.
Figure 3:
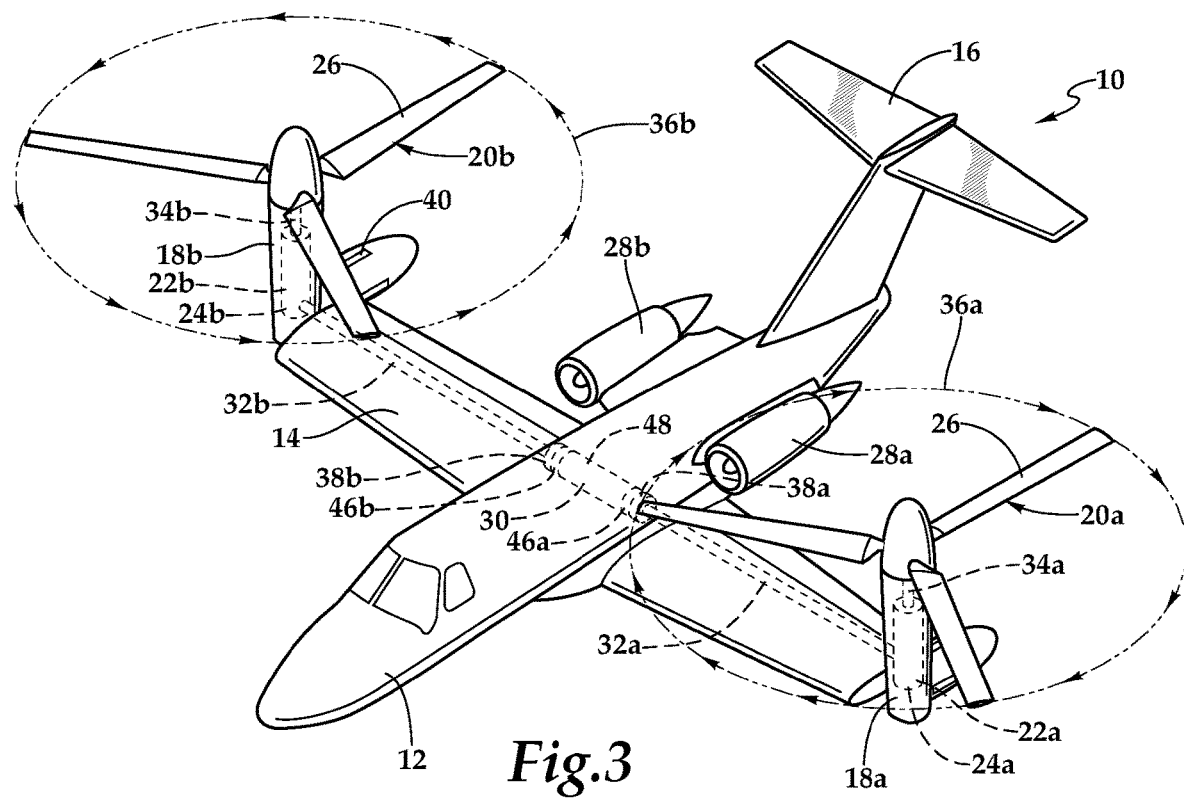
FIG. 3 is a schematic illustration of a tiltrotor aircraft including proprotor lockout systems in accordance with embodiments of the present disclosure.

Even though aircraft 10 has been described as having proprotor lockout systems 42a, 42b disposed within proprotor gearboxes 22a, 22b, it should be understood by those having ordinary skill in the art that proprotor lockout systems could be positioned at any location along the proprotor drive shaft. For example, FIG. 2 depicts aircraft 10 having two standalone proprotor lockout systems 44a, 44b that are coupled to nonrotating airframe structure within wing 14 to prevent relative rotation and relative translation therebetween. In the illustrated embodiment, proprotor lockout system 44a is operably associated with proprotor drive shaft 32a and configured to selectively prevent rotation of proprotor assembly 20a. Likewise, proprotor lockout system 44b is operably associated with proprotor drive shaft 32b and configured to selectively prevent rotation of proprotor assembly 20b. As another example, FIG. 3 depicts aircraft 10 having two proprotor lockout systems 46a, 46b that are integrated into mid-wing gearbox 30 that includes a mid-wing gearbox housing 48 that is part of the nonrotating airframe structure of aircraft 10. In the illustrated embodiment, proprotor lockout system 46a is operably associated with proprotor drive shaft 32a and configured to selectively prevent rotation of proprotor assembly 20a. Likewise, proprotor lockout system 46b is operably associated with proprotor drive shaft 32b and configured to selectively prevent rotation of proprotor assembly 20b.

Figure 4A:
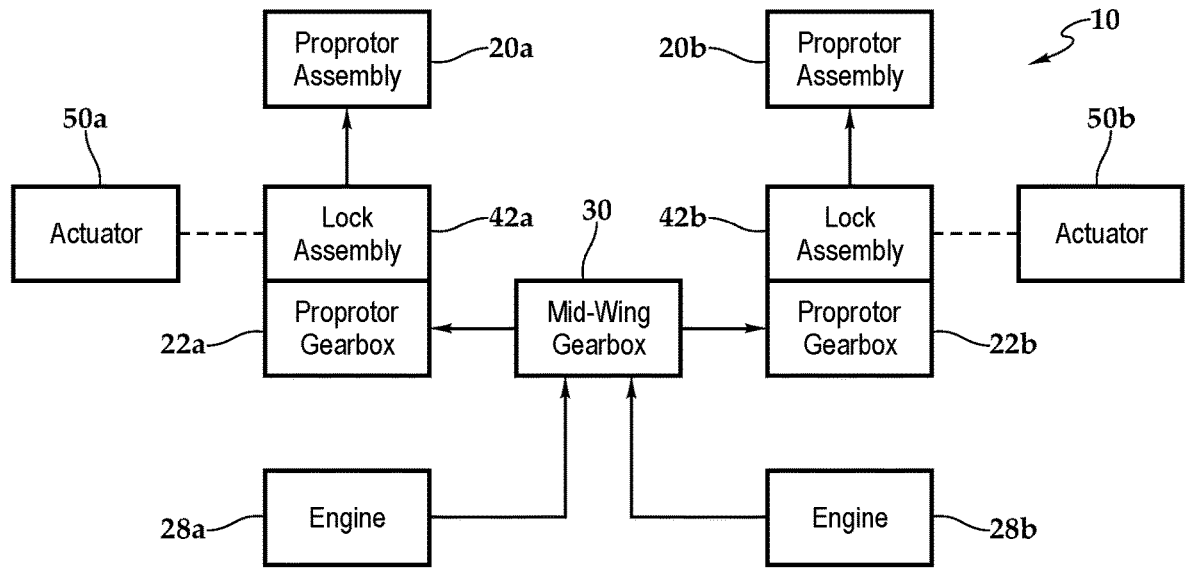
FIGS. 4A-4B are mechanical system diagrams of a tiltrotor aircraft including proprotor lockout systems in accordance with embodiments of the present disclosure.
Figure 4B:
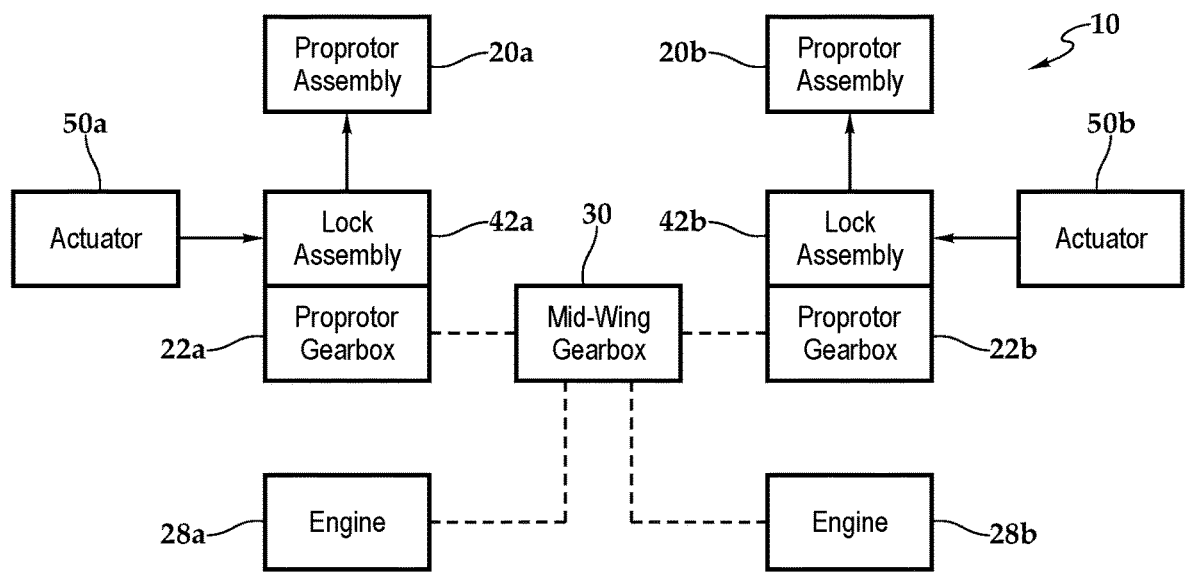

Referring next to FIGS. 4A-4B in the drawings, various mechanical systems of tiltrotor aircraft 10 are depicted in a block diagram format. Aircraft 10 includes a powerplant depicted as engines 28a, 28b that have turboshaft modes, represented in FIG. 4A, and turbofan modes, represented in FIG. 4B. In their turboshaft modes, engines 28a, 28b provide torque and rotational energy to mid-wing gearbox 30, as indicated by the arrows therebetween. Mid-wing gearbox 30 receives torque and rotational energy from one or both of engines 28a, 28b and provides torque and rotational energy to proprotor gearboxes 22a, 22b, as indicated by the arrows therebetween. Proprotor gearbox 22a receives torque and rotational energy from mid-wing gearbox 30 and provides torque and rotational energy to proprotor assembly 20a, as indicated by the arrow therebetween. Proprotor gearbox 22b receives torque and rotational energy from mid-wing gearbox 30 and provides torque and rotational energy to proprotor assembly 20b, as indicated by the arrow therebetween.

When it is desired to transition aircraft 10 from proprotor forward flight mode to airplane forward flight mode, engines 28a, 28b are disengaged from proprotor assemblies 20a, 20b, as indicated by the dashed lines between engines 28a, 28b, mid-wing gearbox 30 and proprotor gearboxes 22a, 22b in FIG. 4B. The proprotor blades may now be feathered for aerodynamic braking and/or brake systems may be used to slow or fully stop the rotation of proprotor assemblies 20a, 20b. Thereafter, aircraft 10 uses lock assemblies 42a, 42b to stop, clock and lock proprotor assemblies 20a, 20b. Lock assemblies 42a, 42b may be positioned between any nonrotating airframe structure and any portion of the drive shafts providing torque and rotational energy from engines 28a, 28b to proprotor assemblies 20a, 20b. In the illustrated embodiment, lock assemblies 42a, 42b are proximate to or within proprotor gearboxes 22a, 22b. As discussed herein, lock assemblies could alternatively be located between mid-wing gearbox 30 and proprotor gearboxes 22a, 22b, proximate to or within mid-wing gearbox 30 or other suitable location along the drive shafts. As discussed herein, each lock assemblies 42a, 42b has a rotating lock member that is operably associated with the drive shaft and a nonrotating lock member that is operably associated with nonrotating airframe structure.

During rotary flight modes, respective rotating lock members and nonrotating lock members are disengaged from one another. During airplane forward flight mode, respective rotating lock members and nonrotating lock members are engaged with one another. Lock assembly 42a is shifted between the disengaged and the engaged positions by actuator 50a. Lock assembly 42b is shifted between the disengaged and the engaged positions by actuator 50b. Actuators 50a, 50b may be hydraulically operated actuators, electrically operated actuators including linear actuators and rotary actuators or other suitable types of actuators. For example, actuators 50a, 50b may be of the type disclosed and described in U.S. Pat. No. 10,843,798 or U.S. Pat. No. 10,875,640, the entire contents of each are hereby incorporated by reference.

Once rotation of proprotor assemblies 20a, 20b has been suitably slowed or fully stopped, actuators 50a, 50b are activated, as indicated by the arrows in FIG. 4B, to shift lock assemblies 42a, 42b from disengaged positions to engaged positions, preventing rotation of proprotor assemblies 20a, 20b and clocking the proprotor blades to be in rotational alignment with respective blade grips as discussed herein. When it is desired to transition aircraft 10 from the airplane forward flight mode back to the proprotor forward flight mode, actuators 50a, 50b are activated, as indicated by the arrows in FIG. 4B, to shift lock assemblies 42a, 42b from engaged positions to disengaged positions to allow rotation of proprotor assemblies 20a, 20b. Thereafter, engines 28a, 28b are reengaged with proprotor assemblies 20a, 20b, as indicated by the arrows between engines 28a, 28b, mid-wing gearbox 30 and proprotor gearboxes 22a, 22b in FIG. 4A, returning aircraft 10 to the rotary flight mode.

Figure 5C:
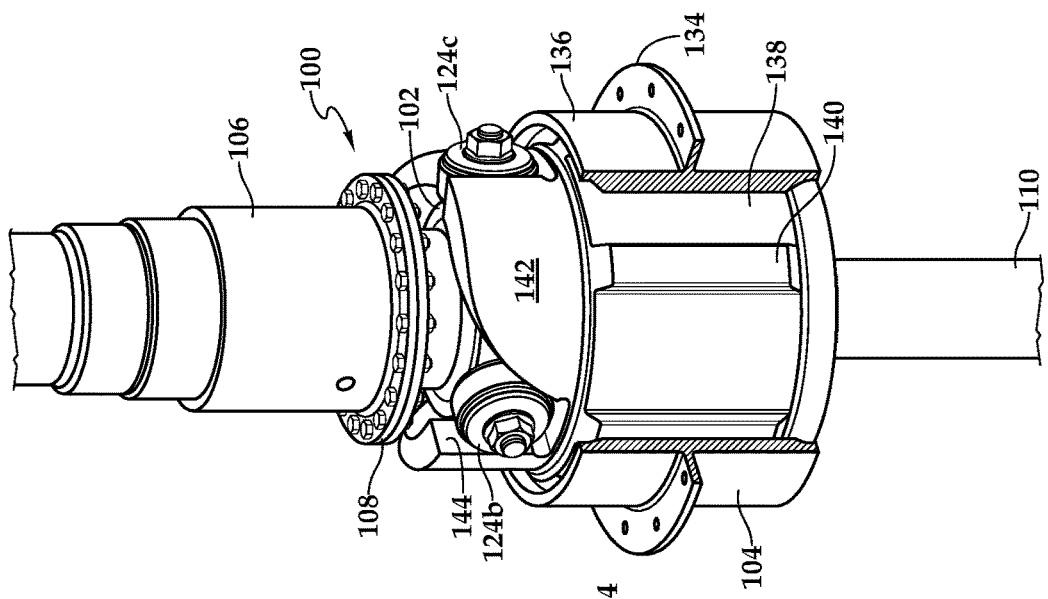
FIGS. 5A-5C are sequential diagrams depicting the operation of a proprotor lockout system for a tiltrotor aircraft in accordance with embodiments of the present disclosure.
Figure 5B:
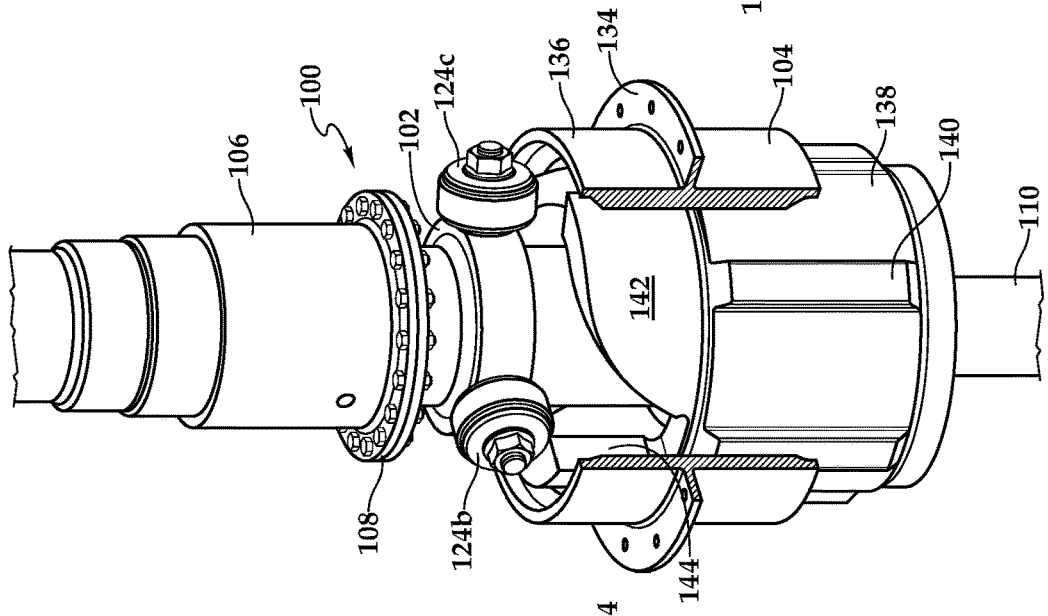
Figure 5A:
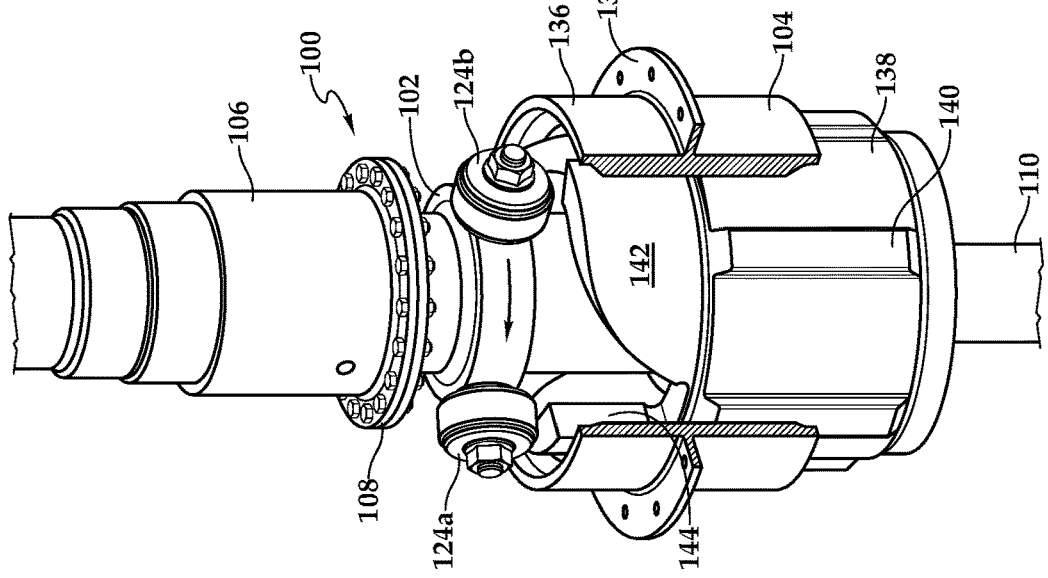
Figure 8:
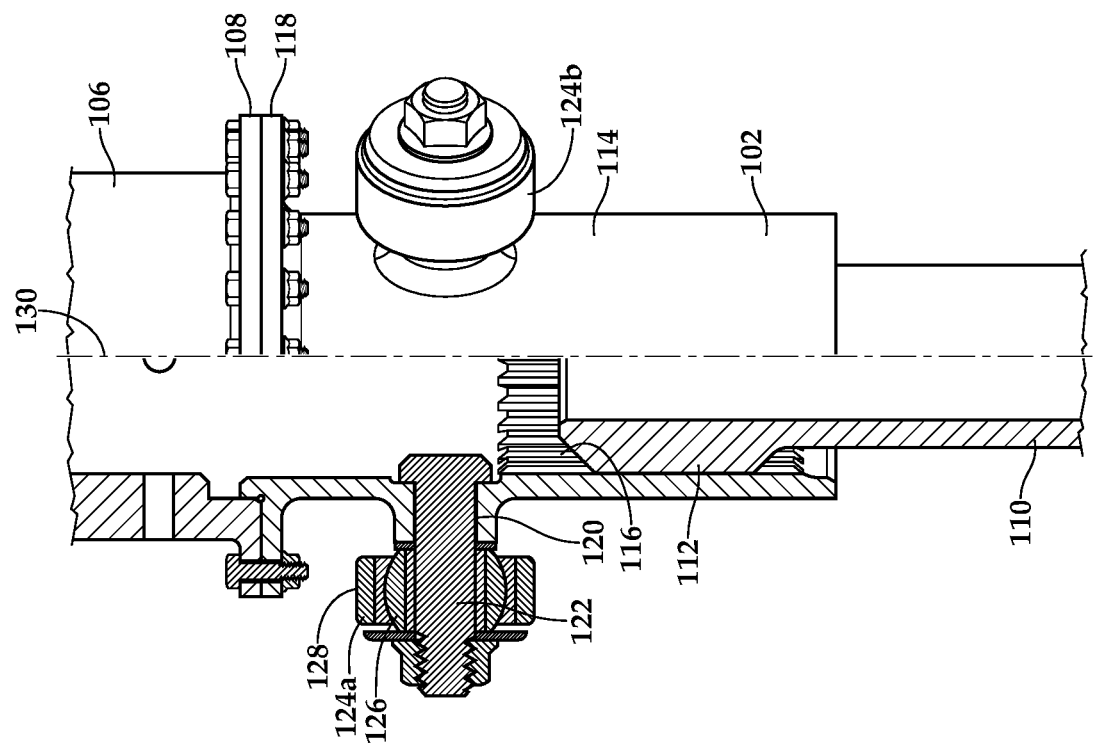
FIG. 8 is a quarter sectional view of a lock member of a proprotor lockout system for a tiltrotor aircraft in accordance with embodiments of the present disclosure.
Figure 9B:
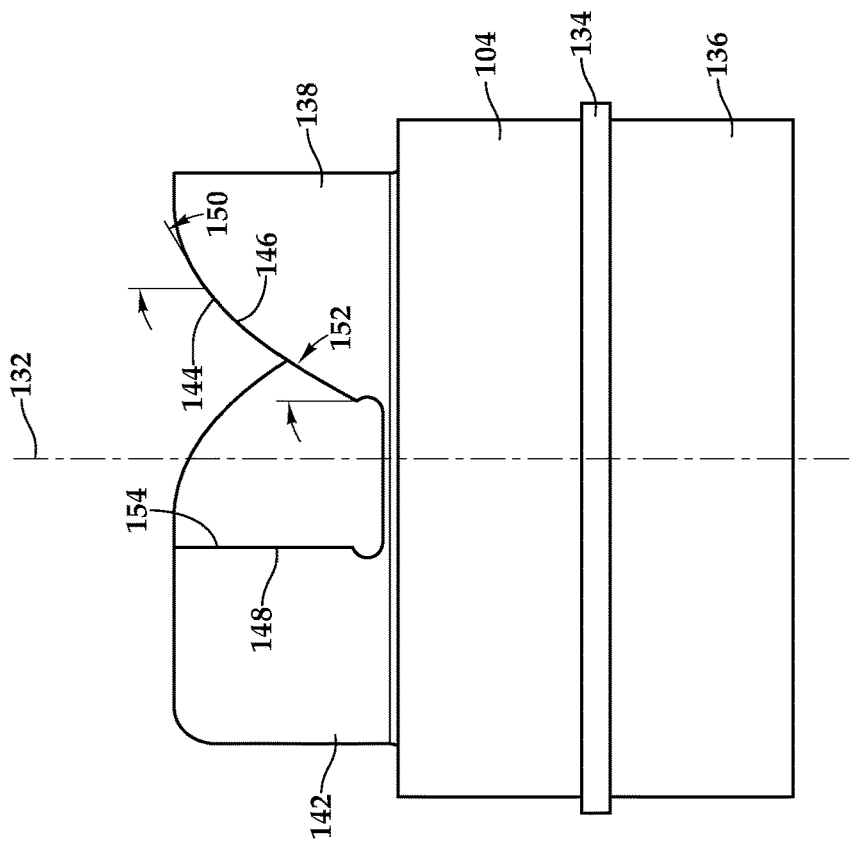
FIGS. 9A-9B are side views of a lock member of a proprotor lockout system for a tiltrotor aircraft in accordance with embodiments of the present disclosure.
Figure 9A:
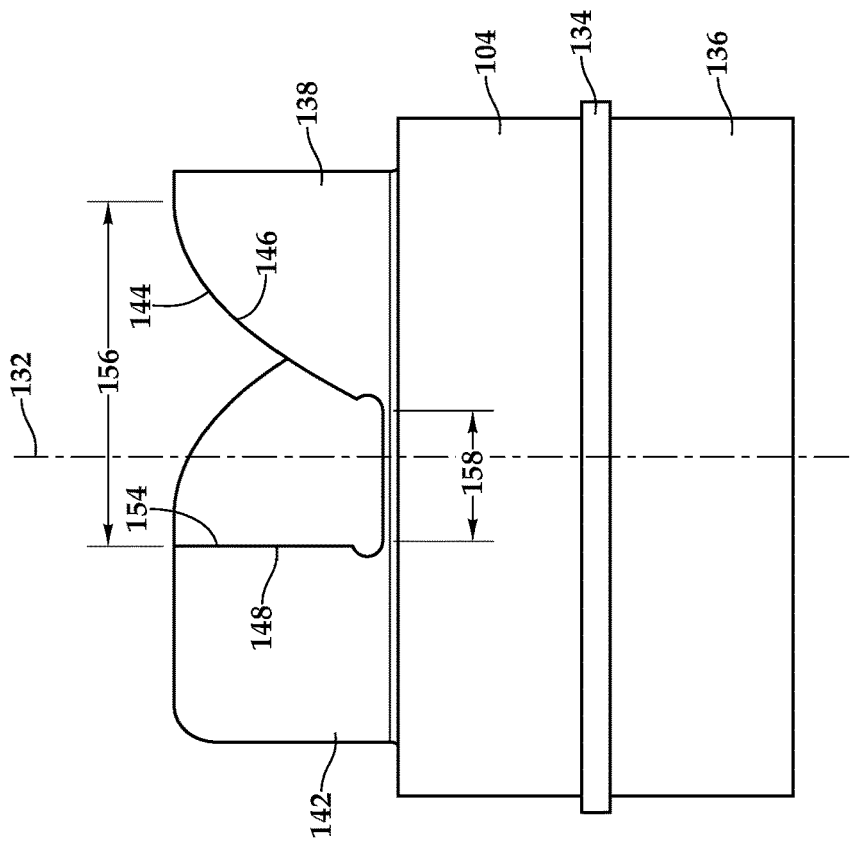

Referring now to FIGS. 5A-5C in the drawings, a lock assembly 100 will be discussed in detail. Lock assembly 100 is representative of lock assemblies 42a, 42b of FIGS. 1A and 4A-4B, lock assemblies 44a, 44b of FIG. 2 and lock assemblies 46a, 46b of FIG. 3. Lock assembly 100 includes a rotating lock member 102 and a nonrotating lock member 104. Rotating lock member 102 is coupled to a mast 106 at flange connection 108 and to a proprotor drive shaft 110 at a spline connection 112 (see FIG. 8) such that rotating lock member 102 rotates with mast 106 during proprotor operations, as indicated by the arrow in FIG. 5A. Rotating lock member 102 includes a collar assembly 114 having in internal splines 116 and an upper flange end 118, as best seen in FIG. 8. Collar assembly 114 has three openings, only opening 120 being visible in FIG. 8, that receive bearing pins therethrough such as bearing pin 122 received through opening 120. Each bearing pin is part of a bearing assembly 124a, 124b, 124c. In the illustrated embodiment, bearing assemblies 124a, 124b, 124c are spherical roller bearings having outer roller surfaces. For example, bearing assembly 124a has a spherical element 126 and an outer roller surface 128, as best seen in FIG. 8. Using spherical roller bearings is beneficial in overcoming any misalignment between the axis of rotation 130 of rotating lock member 102 and a central axis 132 of nonrotating lock member 104 (see FIGS. 9A-9B) during engagement operations. Depending upon the specific implementation, the outer roller surfaces may be hardened roller surfaces, which helps to prolong the life of bearing assemblies 124a, 124b, 124c or may be high lubricity roller surfaces, which reduces friction between bearing assemblies 124a, 124b, 124c and contact surfaces. In the illustrated embodiment, bearing assemblies 124a, 124b, 124c are uniformly circumferentially distributed at 120 degree intervals about collar assembly 114. In other embodiments, a rotating lock member could have other numbers of bearing assemblies both less than or greater than three in other uniform or nonuniform circumferential distributions.

Figure 7:
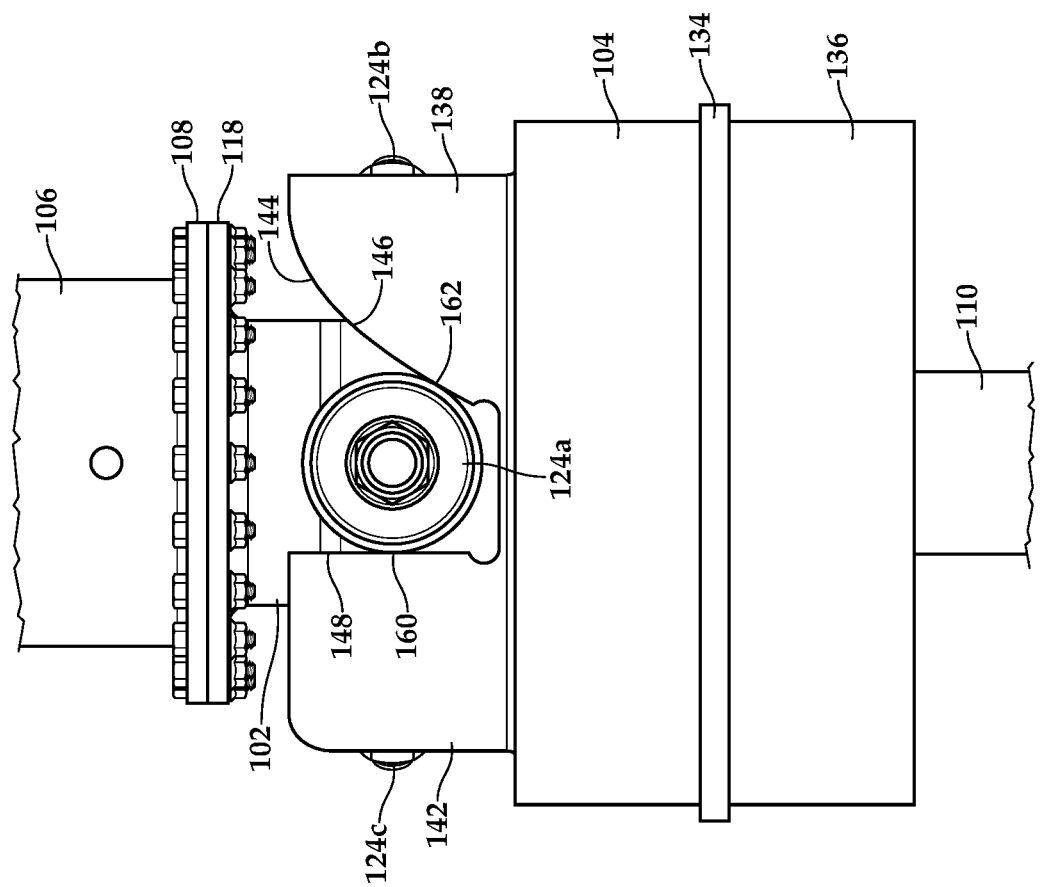
FIG. 7 is a side view of a lock assembly of a proprotor lockout system for a tiltrotor aircraft in accordance with embodiments of the present disclosure.

Nonrotating lock member 104 is coupled to a nonrotating airframe structure (not pictured in FIGS. 5A-5C for clarity) such as the housing of a gearbox or a wing airframe structure. For example, nonrotating lock member 104 may be coupled to the nonrotating airframe structure at a flange connection formed by bolting flange 134 to a mating flange of the nonrotating airframe structure. Nonrotating lock member 104 includes a sleeve 136 that supports flange 134 and a piston 138 that is slidably received within sleeve 136. Sleeve 136 is depicted with a section cutaway to better reveal components therein. Sleeve 136 and piston 138 include a nonrotation feature to prevent relative rotation therebetween depicted in the illustrated embodiment as a plurality of exterior lugs 140 on piston 138 that mate with an equal plurality of interior rails (not visible) on sleeve 136. In other embodiments, a sleeve and piston of a nonrotating lock member could have other types of nonrotation features such as mating splines. At its upper end, piston 138 includes a cradle 142 having three asymmetric slots, such as asymmetric slot 144, as best seen in FIG. 7.

Each asymmetric slot includes a leading ramp and a trailing stop, such as leading ramp 146 and trailing stop 148 of asymmetric slot 144. In the illustrated embodiment, leading ramp 146 has a curved upper profile with a progressively decreasing angle between about 60 degrees (see angle 150 in FIG. 9B) to about 30 degrees (see angle 152 in FIG. 9B). In other embodiments, leading ramp 146 could have other profile configurations including non-curved profiles, profiles having a constant angle, profiles having a step function, profiles having a horizontal portion or other suitable profiles. Trailing stop 148 has a surface 154 that is substantially parallel with central axis 132. The parallel surface 154 of trailing stop 148 and the profile of leading ramp 146 create the asymmetry of asymmetric slot 144 such that an entry gap 156 of asymmetric slot 144 is wider than a base gap 158 of asymmetric slot 144. In the illustrated embodiment, entry gap 156 is at least twice as wide as base gap 158. In other embodiments, the ratio of the entry gap to the base gap could be greater than or less than 2 to 1 such as 1.5 to 1, 3 to 1, 4 to 1 or other suitable ratio, wherein maximizing the width of entry gap 156 is desirable.

The combination of the large entry gap 156, the curved upper profile of leading ramp 146 and the parallel surface 154 of trailing stop 148 enables entry of a coarsely aligned bearing assembly into asymmetric slot 144, provides a guided path for the received bearing assembly and offers a positive seat for the received bearing assembly. For example, bearing assembly 124a is fully seated in asymmetric slot 144 when bearing assembly 124a has two points of contact within asymmetric slot 144 at contact point 160 with trailing stop 148 and contact point 162 with leading ramp 146. In addition, the combination of the outer roller surface 128 of bearing assembly 124a and the angle 152 of leading ramp 146 proximate contact point 162 provides freedom for bearing assembly 124a to exit asymmetric slot 144 when it is desired to disengage lock assembly 100. In the illustrated embodiment, the asymmetric slots are uniformly circumferentially distributed at 120 degree intervals about cradle 142. In other embodiments, a cradle could have other numbers of asymmetric slots both less than or greater than three in other uniform or nonuniform circumferential distributions with the number of asymmetric slots and the circumferential distribution thereof matching that of the bearing assemblies of the rotating lock member.

A first operating scenario of lock assembly 100 will now be described with reference to FIGS. 5A-5C. During rotary flight modes, rotating lock member 102 and nonrotating lock member 104 are disengaged from one another to allow rotation of rotating lock members 102 and thus mast 106 as indicated by the arrow in FIG. 5A. When it is desired to transition aircraft 10 from proprotor forward flight mode to airplane forward flight mode, the engines are disengaged from the proprotor assemblies and the proprotor blades are feathered for aerodynamic braking and/or brake systems may be used to stop the rotation of the proprotor assemblies. In the illustrated embodiment depicted in FIG. 5B, each of the bearing assemblies 124a, 124b, 124c has stopped in substantial circumferential alignment with a base gap of a respective asymmetric slot 144 using, for example, position sensors associated with the brake systems to stop the associated drive shaft in a desired rotational position. Lock assembly 100 is now operated from the disengaged position (FIG. 5B) to the engaged position (FIG. 5C) responsive to hydraulic or electrical actuator commands that shift piston 138 relative to sleeve 136 which results in cradle 142 moving toward radial bearings 124a, 124b, 124c until each of radial bearings 124a, 124b, 124c is seated within one of asymmetric slots 144 in contact with both trailing stop 148 and leading ramp 146. In this position, rotating lock member 102 is fixed against rotation by nonrotating lock member 104 which prevents rotation of the associated proprotor assembly and clocks the proprotor blades to be in rotational alignment with respective blade grips for blade folding as discussed herein.

When it is desired to transition aircraft 10 from the airplane forward flight mode back to the proprotor forward flight mode, lock assembly 100 is operated from the engaged position (FIG. 5C) to the disengaged position (FIG. 5B) responsive to hydraulic or electrical actuator commands that shift piston 138 relative to sleeve 136. This unseats each of radial bearings 124a, 124b, 124c from the respective asymmetric slot 144 as cradle 142 moves away from radial bearings 124a, 124b, 124c. This axial movement continues until radial bearings 124a, 124b, 124c are axially separated from cradle 142 and able to rotate relative thereto as indicated by the arrow in FIG. 5A.

Figure 6A:
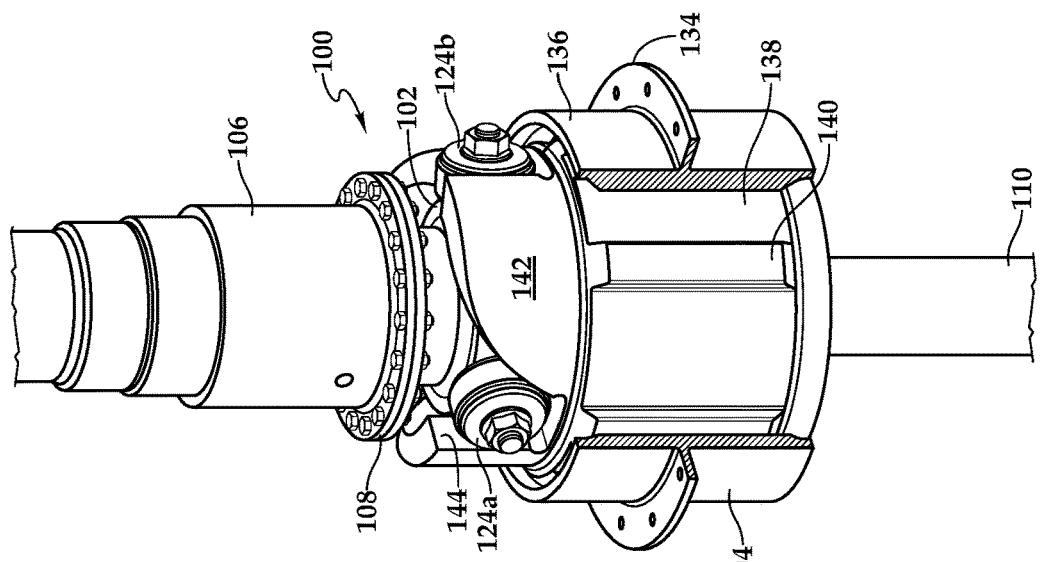
FIGS. 6A-6C are sequential diagrams depicting the operation of a proprotor lockout system for a tiltrotor aircraft in accordance with embodiments of the present disclosure.
Figure 6B:
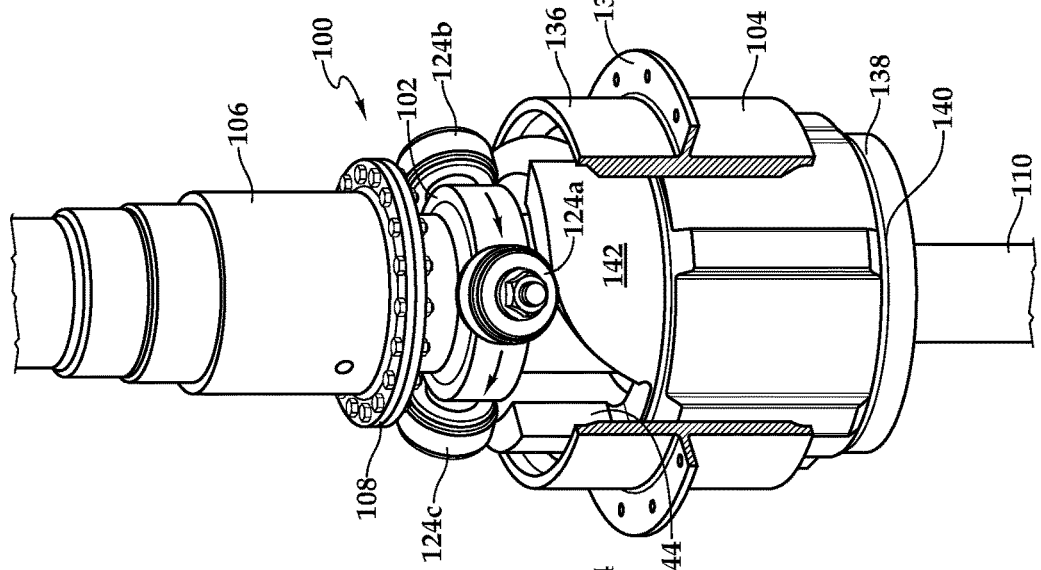
Figure 6C:
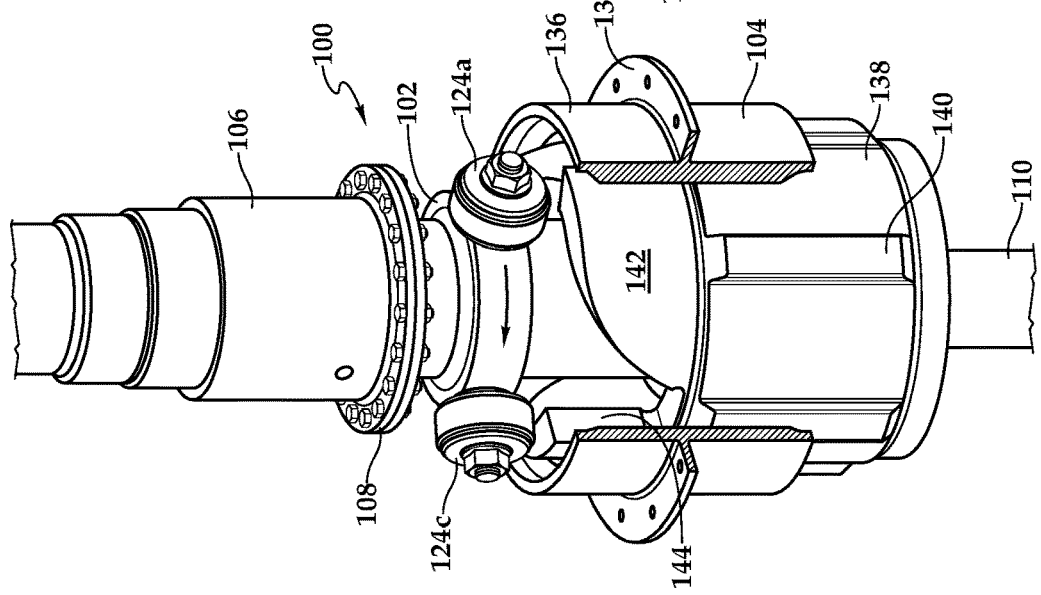

A second operating scenario of lock assembly 100 will now be described with reference to FIGS. 6A-6C. In this case, when it is desired to transition aircraft 10 from proprotor forward flight mode to airplane forward flight mode, the engines are disengaged from the proprotor assemblies and the proprotor blades are feathered for aerodynamic braking and/or brake systems may be used to stop the rotation of the proprotor assemblies. In the illustrated embodiment depicted in FIG. 6B, each of the bearing assemblies 124a, 124b, 124c has stopped in circumferential misalignment with a base gap of a respective asymmetric slot 144 but within circumferential alignment with an entry gap of a respective asymmetric slot 144. Lock assembly 100 is now actuated to shift piston 138 relative to sleeve 136 which results in cradle 142 moving toward radial bearings 124a, 124b, 124c. Upon contact between a leading ramp of each asymmetric slot 144 and one of the radial bearings 124a, 124b, 124c, rotating lock member 102 is urged to rotate, as indicated by the arrows in FIG. 6B. The leading ramps now serve as guides for radial bearings 124a, 124b, 124c, as radial bearings 124a, 124b, 124c move along the leading ramps responsive to the continued axially movement of cradle 142 until each of radial bearings 124a, 124b, 124c is seated within one of asymmetric slots 144 in contact with both trailing stop 148 and leading ramp 146. In this position, rotating lock member 102 is fixed against rotation by nonrotating lock member 104 which prevents rotation of the associated proprotor assembly and clocks the proprotor blades to be in rotational alignment with respective blade grips for blade folding as discussed herein.

When it is desired to transition aircraft 10 from the airplane forward flight mode back to the proprotor forward flight mode, lock assembly 100 is operated from the engaged position to the disengaged position responsive to hydraulic or electrical actuator commands that shift piston 138 relative to sleeve 136. The actuation unseats each of radial bearings 124a, 124b, 124c from the respective asymmetric slot 144 as cradle 142 moves away from radial bearings 124a, 124b, 124c. This axial movement continues until radial bearings 124a, 124b, 124c are axially separated from cradle 142 and able to rotate relative thereto as indicated by the arrow in FIG. 6A.

A third operating scenario of lock assembly 100 will now be described with reference to FIGS. 6A-6C. In this case, when it is desired to transition aircraft 10 from proprotor forward flight mode to airplane forward flight mode, the engines are disengaged from the proprotor assemblies and the proprotor blades are feathered for aerodynamic braking and/or brake systems may be used to slow the rotation of the proprotor assemblies. In the illustrated embodiment, rotating lock member 102 continues to slowly rotate with the rotating proprotor assembly as indicated by the arrows in FIG. 6B. Lock assembly 100 is now actuated to shift piston 138 relative to sleeve 136 which results in cradle 142 moving toward radial bearings 124a, 124b, 124c. Due to the configuration of asymmetric slots 144 of cradle 142, each of the moving radial bearings 124a, 124b, 124c is captured in an entry gap of one of the asymmetric slots 144. Depending upon the speed of rotation of radial bearings 124a, 124b, 124c relative to the speed of axial movement of cradle 142, the leading ramps will serve as guides for radial bearings 124a, 124b, 124c until radial bearings 124a, 124b, 124c are seating within the asymmetric slots 144, which stops the rotation of rotating lock member 102 or radial bearings 124a, 124b, 124c will contact respective trailing stops 148, which stops the rotation of rotating lock member 102 and further axial movement of cradle 142 seats radial bearings 124a, 124b, 124c. In either case, rotating lock member 102 is now fixed against rotation by nonrotating lock member 104 which prevents rotation of the associated proprotor assembly and clocks the proprotor blades to be in rotational alignment with respective blade grips for blade folding as discussed herein. As should be apparent to those having ordinary skill in the art, for proprotor assemblies rotating in the opposite direction as that depicted in FIGS. 6A-6B, the orientation of the leading ramps and the trailing stops of the asymmetric slots would be reversed such that moving radial bearings would be properly captured, guided, stopped and seated in the asymmetric slots.

When it is desired to transition aircraft 10 from the airplane forward flight mode back to the proprotor forward flight mode, lock assembly 100 is operated from the engaged position to the disengaged position responsive to hydraulic or electrical actuator commands that shift piston 138 relative to sleeve 136. The actuation unseats each of radial bearings 124a, 124b, 124c from the respective asymmetric slot 144 as cradle 142 moves away from radial bearings 124a, 124b, 124c. This axial movement continues until radial bearings 124a, 124b, 124c are axially separated from cradle 142 and able to rotate relative thereto as indicated by the arrow in FIG. 6A.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A lockout system for an aircraft having a rotor assembly, the lockout system comprising:
   a drive shaft coupled to and rotatable with the rotor assembly;
   a nonrotating airframe structure disposed proximate the drive shaft; and
   a lock assembly having first and second lock members, the first lock member coupled to and rotatable with the drive shaft, the second lock member coupled to the nonrotating airframe structure, the first lock member including a plurality of bearing assemblies, the second lock member including a cradle having a plurality of asymmetric slots, each asymmetric slot including a leading ramp, a trailing stop and an entry gap;
   wherein, the lock assembly has a plurality of positions including a disengaged position in which rotation of the drive shaft is allowed and an engaged position in which each of the bearing assemblies is seated within one of the asymmetric slots; and
   wherein, the lock assembly is actuated from the disengaged position to the engaged position by moving the cradle toward the bearing assemblies, capturing each of the bearing assemblies in a respective one of the entry gaps, and guiding each of the bearing assemblies with the respective leading ramp as the cradle rotates relative to the bearing assemblies until a leading surface of each of the bearing assemblies contacts a respective one of the trailing stops, thereby seating the bearing assemblies within the asymmetric slots and preventing relative rotation between the drive shaft and the nonrotating airframe structure.

2. The lockout system as recited in claim 1 wherein, the drive shaft is disposed in a wing of the aircraft.

3. The lockout system as recited in claim 1 wherein, the drive shaft further comprises a proprotor mast.

4. The lockout system as recited in claim 1 wherein, the nonrotating airframe structure further comprises a gearbox housing.

5. The lockout system as recited in claim 1 wherein, the nonrotating airframe structure further comprises a wing airframe structure.

6. The lockout system as recited in claim 1 wherein, each of the bearing assemblies further comprises a spherical roller bearing.

7. The lockout system as recited in claim 1 wherein, each of the bearing assemblies further comprises at least one of a hardened roller surface or a high lubricity roller surface.

8. The lockout system as recited in claim 1 wherein, the plurality of bearing assemblies further comprises first, second and third bearing assemblies.

9. The lockout system as recited in claim 8 wherein, the first, second and third bearing assemblies are uniformly circumferentially distributed at 120 degree intervals.

10. The lockout system as recited in claim 1 wherein, the first lock member further comprises a collar assembly having internal splines configured to couple with external splines of the drive shaft to prevent relative rotation therebetween.

11. The lockout system as recited in claim 1 wherein, the plurality of asymmetric slots further comprises first, second and third asymmetric slots.

12. The lockout system as recited in claim 11 wherein, the first, second and third asymmetric slots are uniformly circumferentially distributed at 120 degree intervals.

13. The lockout system as recited in claim 1 wherein, the second lock member further comprises a sleeve and a piston, the sleeve coupled to the nonrotating airframe structure to prevent relative rotation and relative translation therebetween, the piston slidably disposed within the sleeve and configured to translate relative thereto to shift the lock assembly between the disengaged and engaged positions.

14. The lockout system as recited in claim 13 wherein, the sleeve and the piston include a nonrotation feature to prevent relative rotation therebetween.

15. The lockout system as recited in claim 1 wherein, for each of the asymmetric slots, the trailing stop has a surface that is substantially parallel with a central axis of the second lock member.

16. The lockout system as recited in claim 1 wherein, for each of the asymmetric slots, the leading ramp has a curved upper profile.

17. The lockout system as recited in claim 1 wherein, for each of the asymmetric slots, the leading ramp has a curved upper profile with a progressively decreasing angle between 60 degrees and 30 degrees.

18. The lockout system as recited in claim 1 wherein, for each of the asymmetric slots, the entry gap is at least twice as wide as a base gap.

19. The lockout system as recited in claim 1 wherein, for each of the bearing assemblies, a trailing surface of the bearing assembly is aft and above a contact point between the bearing assembly and the respective leading ramp.

20. A tiltrotor aircraft having rotary and non-rotary flight modes, in the rotary flight mode, the tiltrotor aircraft operating at least two proprotor assemblies each having a plurality of proprotor blades, in the non-rotary flight mode, the proprotor assemblies are rotationally locked and circumferentially clocked for blade folding, for each proprotor assembly, the aircraft comprising:
   a proprotor drive shaft coupled to and rotatable with the proprotor assembly;
   a nonrotating airframe structure disposed proximate the proprotor drive shaft; and
   a lock assembly having first and second lock members, the first lock member coupled to and rotatable with the drive shaft, the second lock member coupled to the nonrotating airframe structure, the first lock member including a plurality of bearing assemblies, the second lock member including a cradle having a plurality of asymmetric slots, each asymmetric slot including a leading ramp, a trailing stop and an entry gap;
   wherein, the lock assembly has a plurality of positions including a disengaged position in which rotation of the drive shaft is allowed and an engaged position in which each of the bearing assemblies is seated within one of the asymmetric slots; and
   wherein, the lock assembly is actuated from the disengaged position to the engaged position by moving the cradle toward the bearing assemblies, capturing each of the bearing assemblies in a respective one of the entry gaps, and guiding each of the bearing assemblies with the respective leading ramp as the cradle rotates relative to the bearing assemblies until a leading surface of each of the bearing assemblies contacts a respective one of the trailing stops, thereby seating the bearing assemblies within the asymmetric slots and preventing relative rotation between the drive shaft and the nonrotating airframe structure.

* * * * *